United States Patent [19]

Abate

[11] Patent Number: 5,001,891

[45] Date of Patent: Mar. 26, 1991

[54] FILLING AND PACKAGING MACHINE

[75] Inventor: Alessandro Abate, Mercogliano, Italy

[73] Assignee: ITALPACK s.r.l., Avellino, Italy

[21] Appl. No.: 407,960

[22] Filed: Sep. 15, 1989

[30] Foreign Application Priority Data

Jun. 6, 1989 [IT] Italy .................................. 4837 A/89

[51] Int. Cl.$^5$ .............................................. B65B 9/08
[52] U.S. Cl. ........................................ 53/551; 53/548; 53/373.7; 156/583.5
[58] Field of Search ................. 53/551, 550, 548, 554, 53/555, 450, 373, 371; 156/583.5

[56] References Cited

U.S. PATENT DOCUMENTS

| | | | |
|---|---|---|---|
| 2,738,631 | 3/1956 | Jarund | 53/551 |
| 3,006,121 | 10/1961 | Omori | 53/551 |
| 3,320,718 | 5/1967 | Thesing | 53/551 |
| 4,250,796 | 2/1981 | Achelpohl et al. | 156/583.5 X |
| 4,614,078 | 9/1986 | Kawabe | 53/551 |
| 4,891,929 | 1/1990 | Branchi | 53/451 |

*Primary Examiner*—James F. Coan
*Attorney, Agent, or Firm*—Dilworth & Barrese

[57] ABSTRACT

A filling and packaging machine for continuous filling and packaging of containers made from a sheeting tube (51) is described. It consists of a frame in which an extended sheeting tube (51) of rectangular cross-section can be fed vertically downwards (52). A plurality of uniformly spaced guide elements (2) are provided which can be tracked longitudinally on opposite sides of the sheeting tube (51) at the same speed as it and which have a U-shaped part facing the sheeting tube (51) with a base which can be placed flush against one face of the sheeting tube and two lateral faces projecting at right angles and enclosing the sheeting tube (51). A plurality of uniformly spaced, convex (in the direction of the sheeting tube (51)) pressure elements (2) which are located between the guide elements (2) and are capable of travelling with them have a front face (54) directed towards the sheeting tube (51) and lateral faces (55) connected to this. At least one die each is provided on opposed sides of the sheeting tube (51) which can engage the sheeting tube (51) in a vertical plane at right angles to the plane of the guide and pressure elements (1) above the place of engagement of the guide elements (2) and pressure elements (1) at the same speed as the sheeting tube (51). The dies have two mandrel-like elevations in the longitudinal direction of the sheeting tube (51) and facing the same.

35 Claims, 6 Drawing Sheets

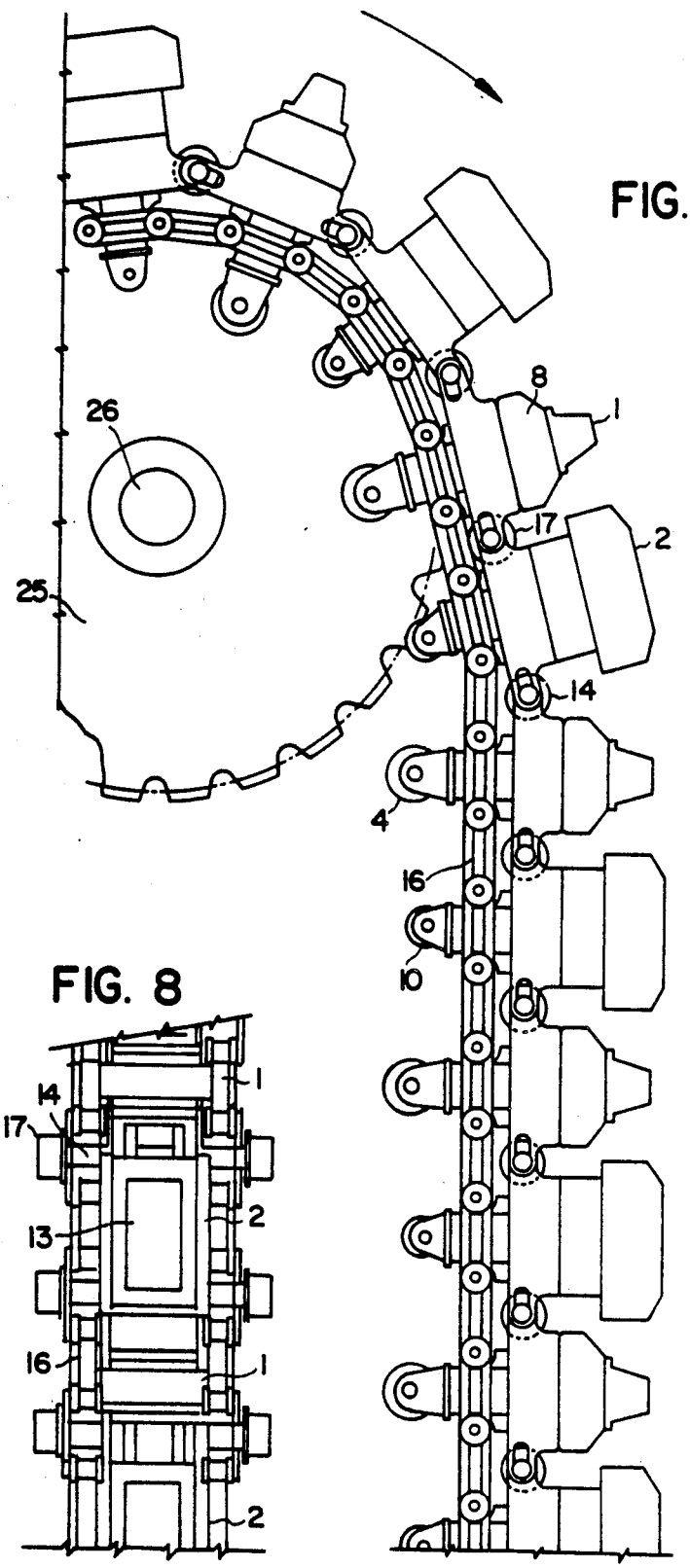
FIG. 6
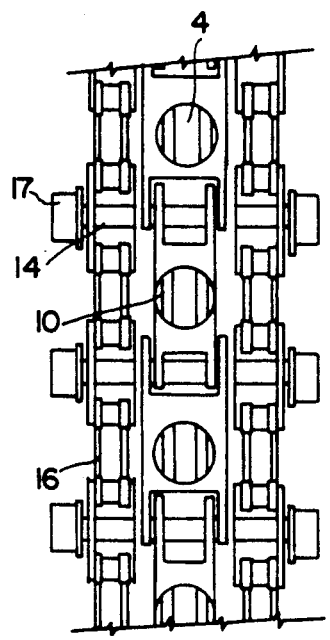
FIG. 7
FIG. 8

FILLING AND PACKAGING MACHINE

BACKGROUND OF THE INVENTION

1. Field of the Invention

The present invention relates to a filling and packaging machine for continuous filling and packaging of containers made from a sheeting tube.

2. Description of the Prior Art

Such machines are already known in the art. In one machine known in the art pre-formed containers are first filled and then closed.

SUMMARY OF THE INVENTION

It is the object of the present invention to improve upon a filling and packaging machine for continuous filling and packaging of containers. In particular, it is intended to make it possible to form the containers continuously from a sheeting tube, fill them and then to finish them.

In order to meet these requirements, the filling and packaging machine for continuous filling and packaging of containers made from a sheeting tube according to the invention consists of: a frame in which an extended sheeting tube of rectangular cross-section can be fed vertically downwards; a plurlity of uniformly spaced guide elements which can be tracked longitudinally on opposite sides of the sheeting tube at the same speed as it and which have a U-shaped part facing the sheeting tube with a base which can be placed flush against one face of the sheeting tube and two lateral faces projecting at right angles and enclosing the sheeting tube; a plurality of uniformly spaced, convex (in the direction of the sheeting tube) pressure elements located between the guide elements and capable of travelling with them and which have a front face directed towards the sheeting tube and lateral faces connected to this; and at least one die each on opposed sides of the sheeting tube which can engage the sheeting tube in a vertical plane at right angles to the plane of the guide and pressure elements above the place of engagement of the guide and pressure elements at the same speed as the sheeting tube and which has two mandrel-like elevations in the longitudinal direction of the sheeting tube and facing the same.

The extended sheeting tube of rectangular cross-section can be fed vertically downwards in the frame. It can be filled with the product to be packaged at this stage. This is particularly advantageous if a liquid is to be packaged since in this case the container can be manufactured and closed below the surface level of the liquid. The infeed of the liquid to be packaged into the machine is controlled such that the surface level of the liquid is always higher than the place where the container is sealed. In this way, the possibility that air is retained in the container in addition to the liquid to be packaged can be absolutely excluded.

Uniformly spaced guide elements which can travel at the same speed as the sheeting tube are located on opposed sides of the sheeting tube. The guide elements have a U-shaped part facing the sheeting tube with a base which can be placed flush against one face of the sheeting tube and two lateral faces projecting at right angles and enclosing the sheeting tube. Two opposed guide elements, therefore, almost completely enclose the sheeting tube in the region of a container. This serves to stabilize the shape of the part of the sheeting tube which later becomes the container even when it has been filled with the product to be packaged, especially if a liquid is to be packaged.

Convex (in direction of the sheeting tube) pressure elements with a front face directed towards the sheeting tube and lateral faces connected to it are located between the guide elements and capable of travelling with them. The pressure elements press the sheeting tube together between the zones which later form the container. The link zones between the later container zones are thus made in the region of the pressure elements. To this end the front faces are configured such that they are opposed with a spacing equivalent to approximately double the thickness of the sheeting. The spacing can also be smaller in order to exert a corresponding pressure on the two sheeting layers between the faces. The product to be packaged, especially in the case of a liquid, is completely removed from the area between the two front faces. The pressure elements are designed to be convex in the area which engages the sheeting tube in order to be able to move them away again without difficulty subsequently from the sheeting tube.

At least one die is also provided on each of the opposed sides of the sheeting tube which can engage the sheeting tube in a vertical plane at right angles to the plane of the guide and pressure elements above the place of engagement of the guide and pressure elements at the same speed as the sheeting tube and which has two mandrel-like elevations in the longitudinal direction of the sheeting tube and facing the same. These mandrel-like elevations are responsible for forming the "tabs" on both ends of the later container. This is necessary because the container formed from the sheeting tube must be folded at both ends—viewed in the longitudinal direction of the sheeting tube. This folding must occur inwardly in order to make the container aesthetically appealing and in order to be able to stack the finished containers easily and with maximum space saving. The intention, therefore, is to produce a cuboid shape in the finished container which can only be achieved if the ends of the container are folded inwards. To this end, the mandrel-like elevations press the sheeting tube material inwards. The dies are located above the place of engagement of the guide and pressure elements so that the dies engage the sheeting tube before the guide and pressure elements and are not impeded by them. The planes of the dies on the one hand and the guide and pressure elements on the other run at right angles to each other since the indentations for the tabs of the later container must also be located at right angles to the end faces of the containers when they are pressed together.

Advantageous improvements to the invention are described in the dependent claims.

In the preferred embodiment each guide element has a inner guideway running at right angles to the sheeting tube in which a gudgeon is mounted such that it can be longitudinally displaced, which gudgeon has a roller on the end facing away from the sheeting tube which runs over a frame-mounted cam track and, on the end facing the sheeting tube, has a dosing plate parallel to it. This configuration is particularly advantageous if a liquid is to be packaged. By means of varying the distance between two opposed dosing plates it is possible to vary the volume of liquid being packaged in a container. The smaller the spacing between the two opposed dosing plates, the smaller the volume of liquid packaged in each container. The distance between the dosing plates can be altered by adjusting the frame-mounted cam track. It is, therefore, possible to set the precise volume of liquid to be packaged by means of adjusting this can track.

In the preferred embodiment there is a compression spring in the inner guideway of the guide element which encloses the gudgeon and presses against a stop on the guide element on the one hand and a stop on the gudgeon on the other. Consequently the gudeon is spring-loaded with the result that the gudgeon roller is in constant contact with the cam track.

The cam track is preferably adjustable so that the machine can be adapted to handle the packaging of different liquid volumes.

According to an advantageous improvement, the lateral faces of the pressure elements are plane and are at an obtuse angle to the front face. This configuration is particularly simple and inexpensive.

In the preferred embodiment every pressure element has an inner guideway at right angles to the sheeting tube in which a gudgeon is mounted such that is is longitudinally displaceable, which gudgeon has a roller on the end facing away from the sheeting tube which runs over a frame-mounted cam track and, on the end facing the sheeting tube, has the front face parallel to it. The distance of the cam track from the central axis of the sheeting tube thus, via the roller and the gudgeon, determines the distance between two opposed front faces of two pressure elements. As already described above, this distance must correspond to approximately double the thickness of the sheeting tube. This can be achieved by means of an appropriate configuration of the cam surface. If it becomes necessary to increase the pressure the distance between the cam track and the central axis of the sheeting tube can be reduced such that the distance between opposed front faces is also reduced. The opposite procedure is used if the pressure is to be reduced.

In the preferred embodiment there is a compresssion spring in the inner guideway which encloses the gudgeon and presses against a stop on the pressure element on the one hand and a stop on the gudgeon on the other. Consequently the gudgeon bearing the front face is spring-loaded with the result that the gudgeon roller is in constant contact with the cam track.

The cam track is preferably adjustable, and in particular its height is adjustable. By adjusting the height it is possible to influence the chronological sequence of the engagement of the front faces.

The guide elements and/or pressure elements can be located on two chains in a vertical plane on both sides of the sheeting tube and symmetrical to it. Each chain can run over an upper and lower chain wheel rotationally mounted about a horizontal axis located at a given distance from the sheeting tube.

According to an advantageous improvement the dies are mounted on the peripheral surfaces of two cylinders which are rotationally mounted about two axes equidistant from the sheeting tube on two opposed sides of the same. A plurality of dies each at uniform spacing can be located on the peripheral surface of each cylinder. In the preferred embodiment, a gudgeon is mounted such that it can be longitudinally displaced in a guideway at right angles to the peripheral surface of the cylinder, which gudgeon has a roller on the end facing away from the sheeting tube which runs over a frame-mounted cam track and, on the end facing the sheeting tube, has the mandrel-like elevations facing it. By means of an appropriate configuration of the cam track it is possible for the mandrel-like elevations to be moved in the direction of the sheeting tube's longitudinal axis.

In the preferred embodiments a compression spring is provided in the guideway at right angles to the cylindere's peripheral surface which encloses the gudgeon and presses against the peripheral surface of the cylinder on the one hand and a stop on the gudgeon on the other. Consequently the gudgeon is spring-loaded with the result that the gudgeon roller is in constant contact with the cam track.

An advantageous improvement is characterised in that the cam track has an elevation in the area in which the mandrel-like elevations engage the sheeting tube. The mandrel-like elevations are, therefore, directed towards the tube to form the tabs in the place of engagement with the sheeting tube.

The axes of the cylinder are preferably connected with the drive of the guide and pressure elements or the drive of their chains by means of a toothed or angular gear and/or timing belts. This guarantees in a particularly simple manner that the places of engagement of the mandrel-like elevations and the places of engagment of the guide and pressure elements are in a constant position relative to each other.

In the preferred embodiment a welding device is provided in the front faces of the pressure elements. It is particularly advantageous if this welding device consists of electrical resistance wires. This welding device causes heat to be applied to the sheeting zones pressed together by the front faces which results in a weld being formed between the opposed sheeting webs.

BRIEF DESCRIPTION OF THE DRAWINGS

An embodiment of the invention is described in detail below with reference to the accompanying drawings, in which:

FIG. 4 is an enlarged illustration of opposed pressure elements from above;

FIG. 5 is an enlarged illustration of opposed guide elements from above;

FIG. 6 shows a chain with alternating pressure and guide elements;

FIG. 7 shows the chain featured in FIG. 6 in a view from inside;

FIG. 8 shows the chain featured in FIG. 6 in a view from outside; and

DETAILED DESCRIPTION OF THE PREFERRED EMBODIMENTS

Figure 1:
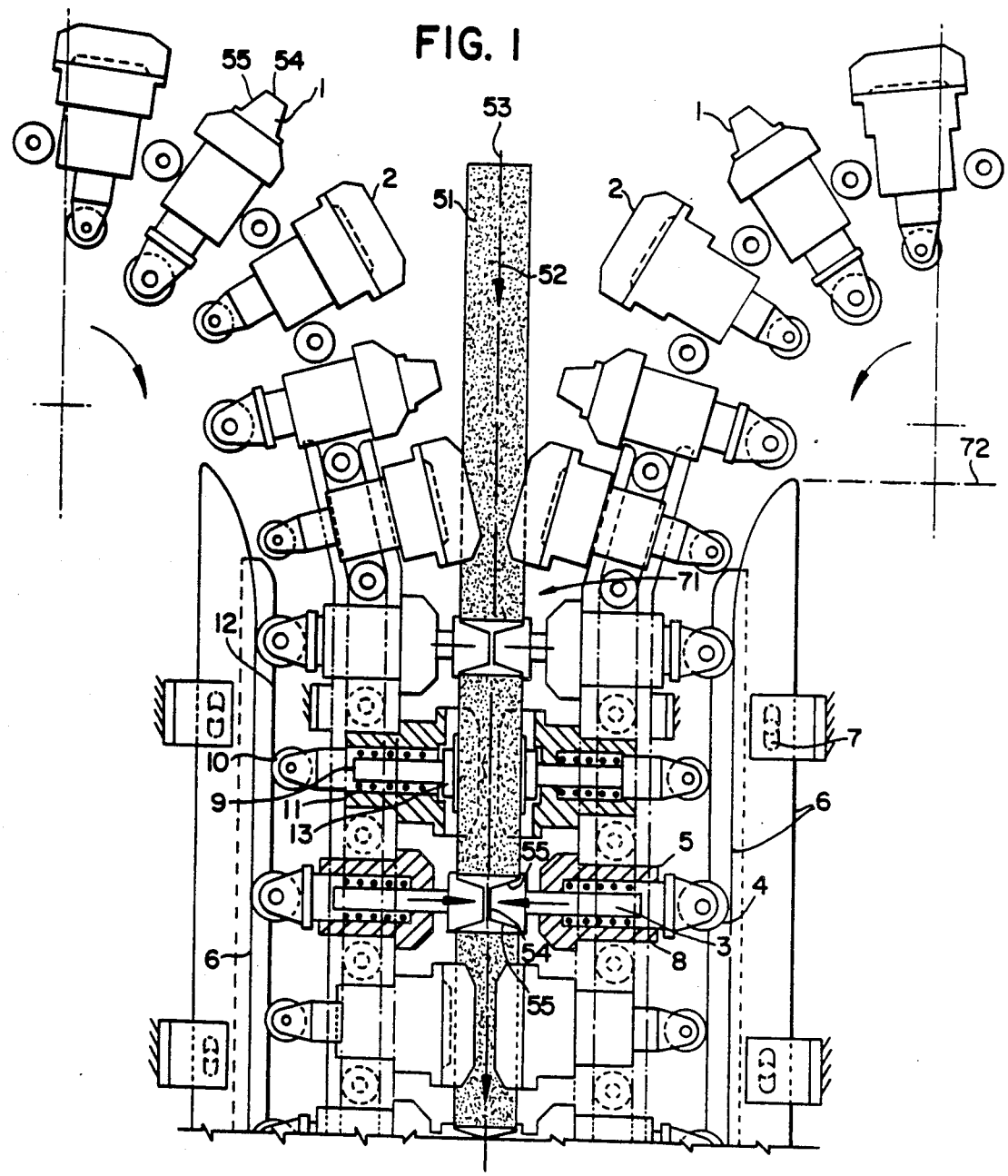
FIG. 1 shows a front view of the infeed zone of the machine, partially in section.

FIG. 1 shows the upper infeed section of a filling and packaging machine for continuous filling and packaging of containers made from a sheeting tube 51. In the machine, the extended sheeting tube 51 of rectangular cross-section can be fed vertically downwards, as indicated by the arrow 52. A plurality of uniformly spaced guide elements 2 are provided which can be tracked longitudinally on opposite sides of the sheeting tube 51 at the same speed as it. In addition, a plurality of uniformly spaced, convex (in the direction of the sheeting tube 51) pressure elements 1 are located between the guide elements 2 which are capable of travelling with them. Every guide element 2 has an inner guideway running at right angles to the sheeting tube 51 in which a gudgeon 9 is mounted such that it can be longitudinally displaced, which gudgeon 9 has a roller 10 on the end facing away from the sheeting tube 51 which runs over a frame-mounted cam track 12 and, on the end facing the sheet tube 51, has a dosing plate 13 parallel to it. A compression spring 11 is provided in the inner guideway of the guide element 2 which encloses the gudgeon 9 and presses against a stop on the guide element 2 on the one hand and a stop of the gudgeon 9 on the other. The gudgeon is thus under a compression load. This ensures that the roller 10 is in constant contact with the cam track 12. Setting the spacing between the cam track 12 and the central axis 53 of the sheeting tube 51 also determines the spacing between the dosing plate 13 and the central axis at the same time.

Every pressure element has a front face 54 directed towards the sheeting tube and lateral faces 55 connected to it. The lateral faces 55 of the pressure elements 1 are plane; they are at an obtuse angle to the front face 54. In addition, every pressure element 1 has an inner guideway at right angles to the sheeting tube 51 in which a gudgeon 3 is mounted such that it is longitudinally displaceable, which gudgeon 3 has a roller 4 on the end facing away from the sheeting tube 51 which runs over a frame-mounted cam track 6 and, on the end facing the sheet tube 51, has the front face 54 parallel to it. A compression spring 5 is provided in the inner guideway which encloses the gudgeon 3 and presses against a stop on the pressure element 1 on the one hand and a stop on the gudgeon 3 on the other. The gudgeon 3 and its roller 4 are thus under a compression load and therefore in constant contact with the cam track 6.

The height of the cam track 6 can be adjusted. Bolts protruding from the cam track 6 engage slots 7 which are provided in housing-mounted plates. The cam track 6 is thus bolted to the frame by means of the bolts and slots 7.

Figure 3:
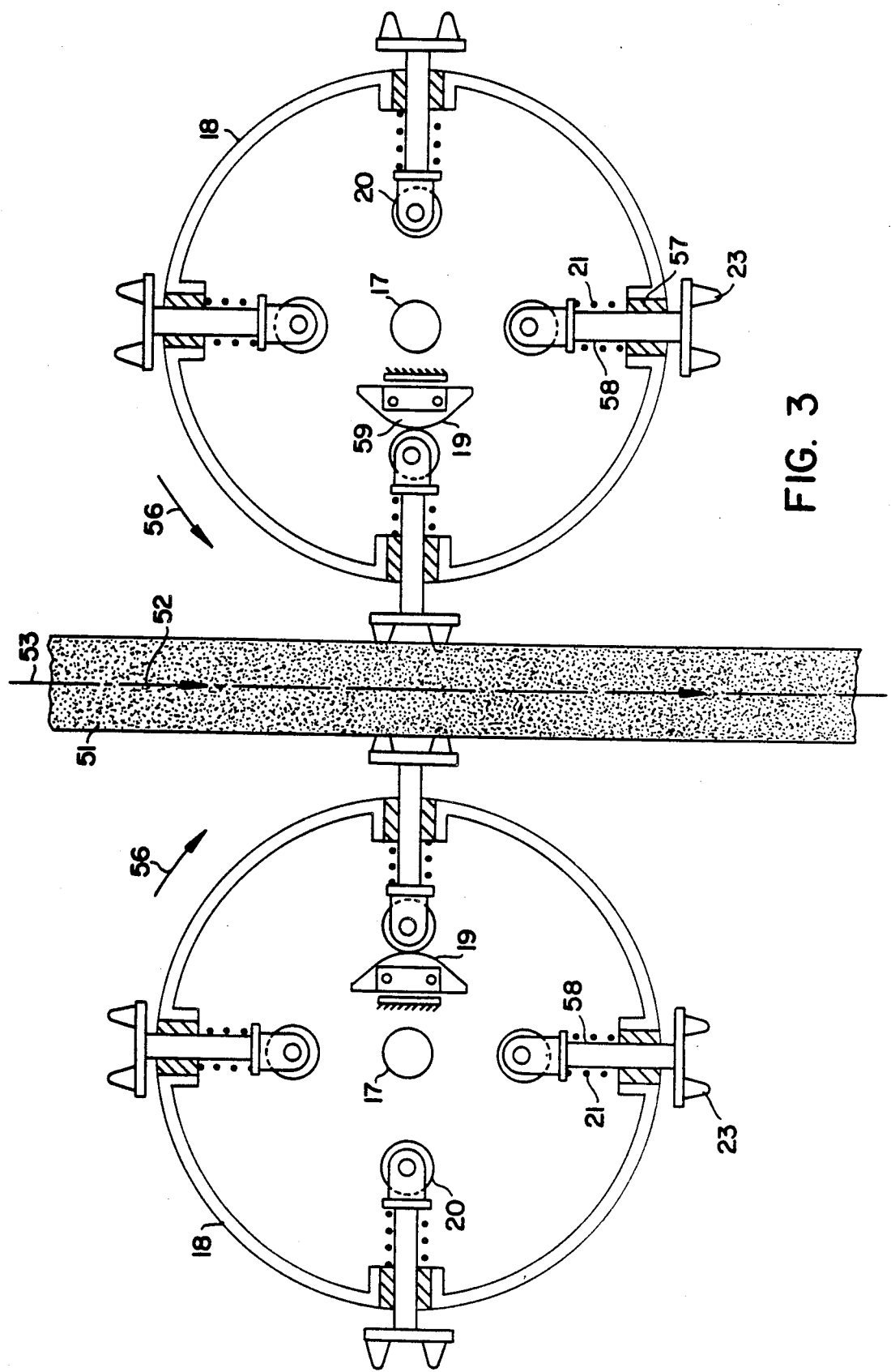
FIG. 3 shows a side view in a vertical plane above the infeed section of the machine at right angles to the plane of FIG. 1.

FIG. 3 shows the mandrel section of the machine. This section is located above the infeed section of the machine shown in FIG. 1. The view shown in FIG. 3 lies in a plane at right angles to the plane of FIG. 1. A cylinder is located on both sides of the sheeting tube 51 which is fed downwards in the direction of the arrow 53. Each cylinder is mounted such that it can rotate about an axis 17. The axes 17 run opposed to each other at a uniform distance from the central axis 53 of the sheeting tube 51. The dies 23 are mounted on the peripheral surfaces of the cylinders 18. The cylinders 18 rotate in opposite directions, as indicated by the arrows 56, at the same speed. The speed is selected such that the peripheral speed of the dies 23 in the place of engagement with the sheet tube 51 is the same and in the same direction as the speed 52 of the sheeting tube 51. The dies 23 lie in a vertical plane at right angles to the plane of the guide elements 2 and pressure elements 1. In the longitudinal direction of the sheeting tube 51 they have two mandrel-like elevations 23 facing the sheeting tube 51. The dies 23 are located on the peripheral surface of each cylinder 18 at a uniform distance. A gudgeon 58 is mounted such that is can be longitudinally displaced in a guideway 57 at right angles to the peripheral surface of the cylinder 18, which gudgeon has a roller 20 on the end facing away from the sheeting tube 51 which runs over a frame-mounted cam track 19 and, on the end facing the sheet tube 51, has the mandrel-like elevations 23 facing it. A compression spring 21 is provided in the guideways 57 which encloses the gudgeon 58 and presses against a stop on the guideway 57 on the one hand and a stop on the gudgeon 58 on the other. Consequently the gudgeon 58 is spring-loaded with the result that it is in constant contact with the cam track 19. The cam track 19 has an elevation 59 in the area in which the mandrel-like elevation 23 engage the sheeting tube 51. The mandrel-like elevations 23 in the place of engagement are additionally directed towards the sheeting tube 51 in this way so that the necessary container tabs are reliably produced.

Figure 2:
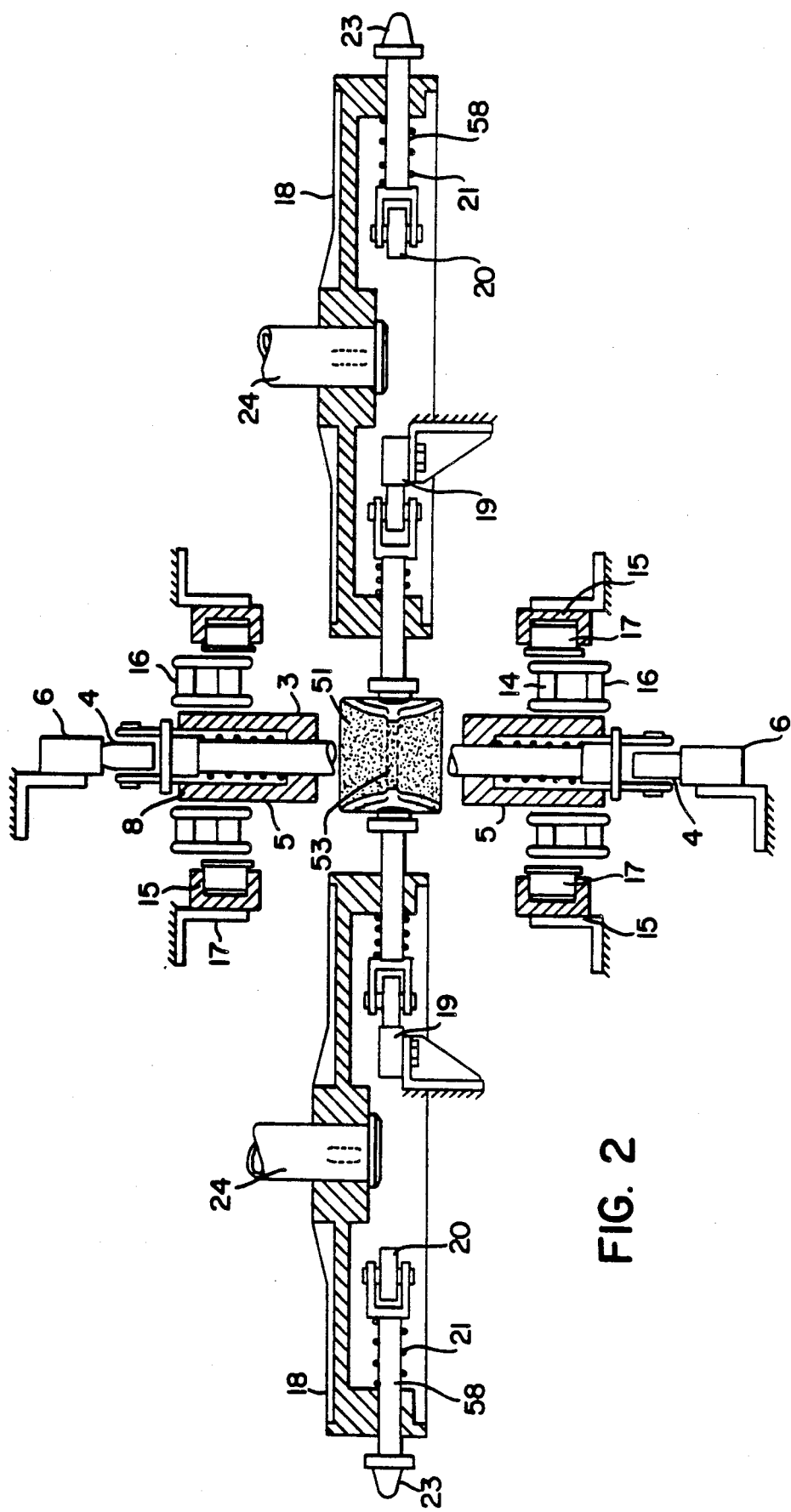
FIG. 2 shows a horizontal section through the machine, partially in different planes.

FIG. 2 shows the device in a section from above. The sheeting tube 51 is in the middle of the drawing. The cylinder 18 shown in FIG. 3 are to the left and right. These are mounted such that they rotate about shafts 24. The same parts are designated by the same reference numbers so that they do not need to be described again. The pressure elements 1 are shown in section above and below the sheeting tube 51.

Figures 4, 5:
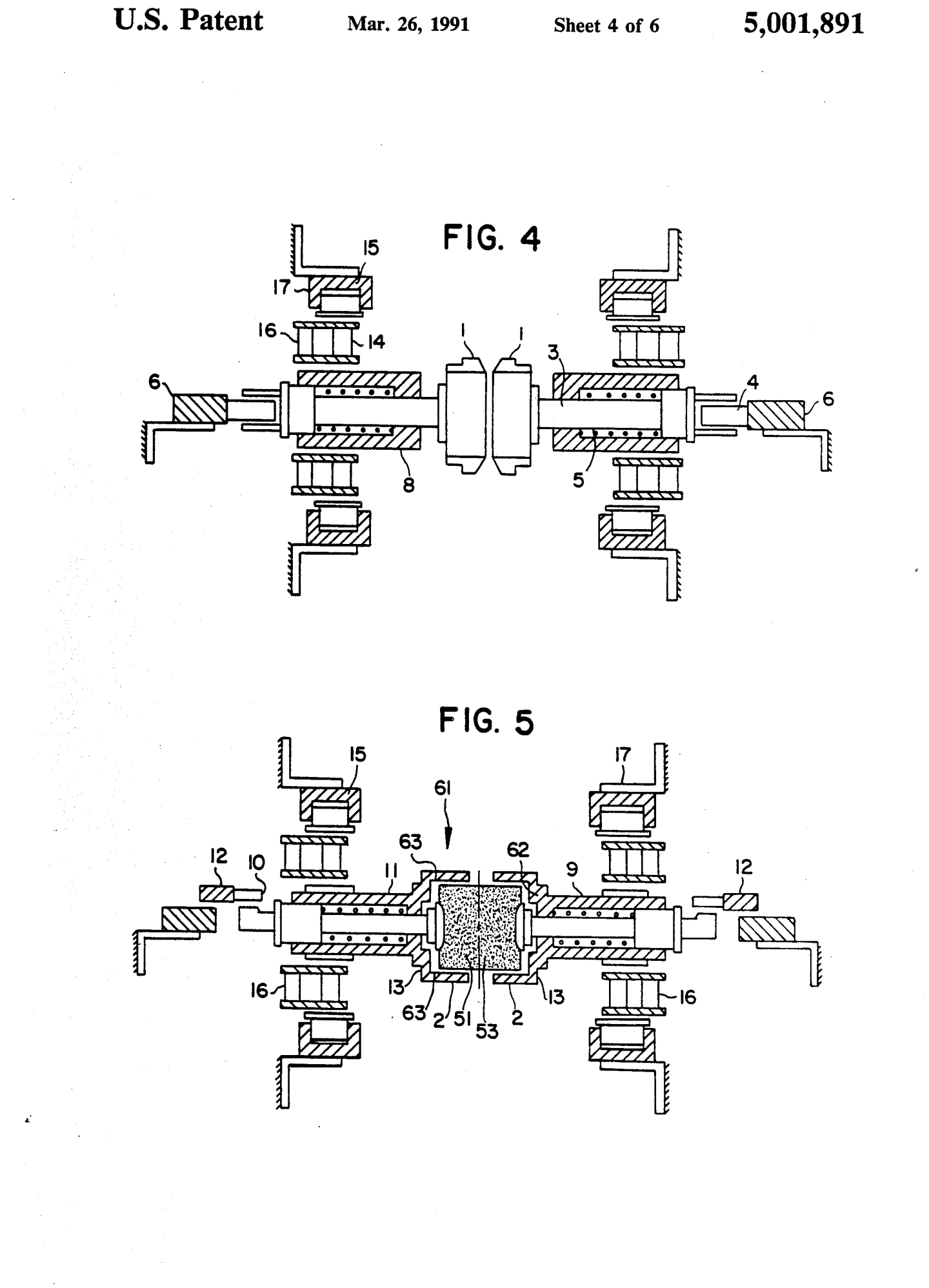

FIG. 4 shows an enlarged illustration of the pressure elements 1 from above.

FIG. 5 shows the guide elements also in an enlarged version from above. Every guide element has a U-shaped part 61 facing the sheeting tube 51 with a base 62 which can be placed flush against one face of the sheeting tube 51 and two lateral faces 63 projecting at right angles and enclosing the sheeting tube 51.

FIG. 6 shows a chain with pressure elements 1 and guide elements 2 located on it. The chain passes around an upper chain wheel 25 which is mounted such that it can rotate about a horizontal axis 26 at a given distance from the sheeting tube. FIGS. 7 and 8 show the chain from inside and outside, respectively.

Figure 9:
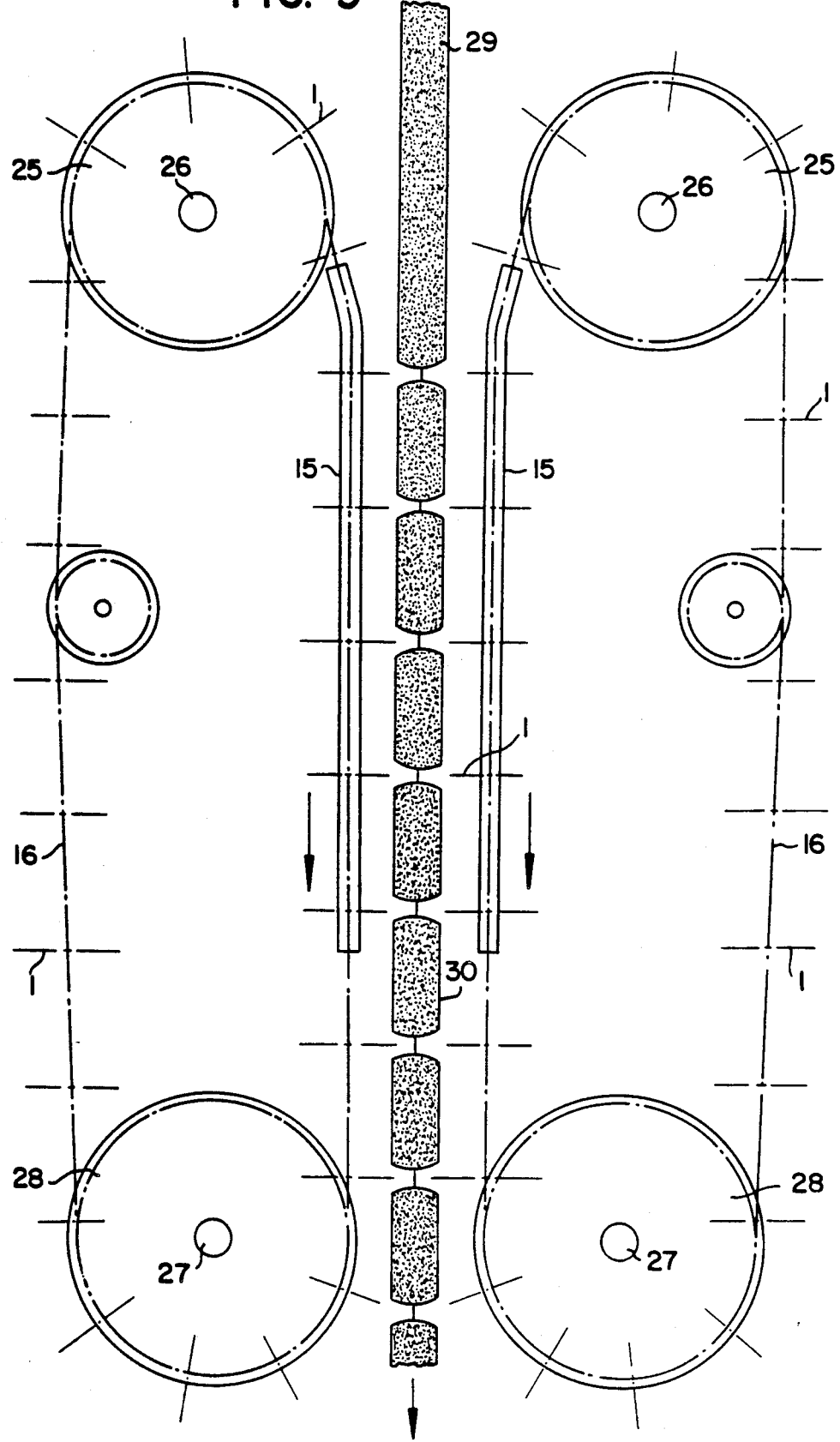
FIG. 9 shows the machine in a schematic view from the front.

FIG. 9 also shows the guide and pressure elements located on two chains. The chains run in a vertical plane on both sides of the sheeting tube 29 and symmetrical to it. Each chain passes around an upper chain wheel 25 and a lower chain wheel 28. The upper chain wheels 25 are mounted such that they can rotate about a horizontal axis 26 at a given distance from the sheeting tube 29. The lower chain wheels 28 are mounted such that they can rotate about a horizontal axis 27 at a given distance from the sheeting tube 29. The facing places of engagement of the chains are designated 15.

The machine's operation can be seen schematically from FIG. 9. The sheeting tube 29 moves from top to bottom in FIG. 9. The action of the pressure elements 1 causes opposed walls of the sheeting tube to be pressed together and subsequently welded. The actual container zones 30 are located between these zones. The sheeting tube therefore leaves the machine as a chain of linked packaging containers. The packaging container chain then consists of uniformly spaced container zones 30 and link zones connecting them.

If a liquid is to be packaged by the machine the surface level of the liquid is higher than the first place of engagement of the pressure elements in the direction of travel of the sheeting tube 29. This first place of engagement is designated 71 in FIG. 1. The surface level of the liquid is thus above this zone, approximately at the level designated 72. This ensures that all air is excluded from the containers. Dosing is achieved by means of the dosing plates 13 of the guide elements 2.

I claim:

1. Filling and packaging machine for continuous filling and packaging of containers made from a sheeting tube (51), which comprises:
   (a) a frame in which an extended sheeting tube (51) of rectangular cross-section can be fed vertically downwards (52);
   (b) a plurality of uniformly spaced guide elements (2) which can be tracked longitudinally on opposite sides of the sheeting tube (51) at the same speed as the sheeting tube (51), and which have a U-shaped part facing the sheeting tube (51) with a base (62) which can be placed flush against one face of the sheeting tube (51) and two lateral faces (63) projecting at right angles and enclosing the sheeting tube (51);
   (c) a plurality of uniformly spaced, pressure elements (1) located between the guide elements (2), said pressure elements (1) being convex in the direction of the sheeting tube (51) and capable of traveling therewith and which have a front face (54) directed towards the sheeting tube (51) and lateral faces (55) connected thereto; and
   (d) at least one die (23) each on opposed sides of the sheeting tube (51) which can engage the sheeting tube (51) in a vertical plane at right angles to the plane of the guide elements (2) and pressure elements (1) above the place of engagement of the guide elements (2) and pressure elements (1) at the same speed (56) as the sheeting tube (51) and which has two mandrel-like elevations (23) in the longitudinal direction of the sheeting tube (51) and facing the same.

2. Machine according to claim 1, characterized in that every guide element (2) has an inner guideway running at right angles to the sheeting tube in which a gudgeon (9) is mounted such that the gudgeon can be longitudinally displaced, which gudgeon (9) has a roller (10) on the end facing away from the sheeting tube (51) which runs over a frame-mounted cam track (12) and, on the end facing the sheeting tube (51), has a dosing plate (13) parallel to it.

3. Machine according to claim 2, characterized in that a compression spring (11) is provided in the inner guideway which encloses the gudgeon (9) and presses against a stop on the guide element (2) on the one hand and a stop on the gudgeon (9) on the other.

4. Machine according to claim 2 or 3, characterized in that the cam track (12) is adjustable.

5. Machine according to claim 4, characterized in that the lateral faces (55) of the pressure elements (1) are plane and at an obtuse angle to the front face (54).

6. Machine according to claim 5, characterized in that each pressure element (1) has an inner guideway at right angles to the sheeting tube (51) in which a gudgeon (3) is mounted such that it is longitudinally displaceable, which gudgeon (3) has a roller (4) on the end facing away from the sheeting tube (51) which runs over a frame-mounted cam track (6) and, on the end facing the sheeting tube (51), has the front face (54) parallel to it.

7. Machine according to claim 6, characterized in that a compression spring (5) is provided in the inner guideway which encloses the gudgeon (3) and presses against a stop on the pressure element (1) on the one hand and a stop on the gudgeon (3) on the other.

8. Machine according to claim 7, characterized in that the cam track (6) is adjustable, in particular that its height (7) can be adjusted.

9. Machine according to claim 8, characterized in that the guide elements (2) and/or the pressure elements (1) are located on two chains (16) in a vertical plane on both sides of the sheeting tube (51) and symmetrical to it.

10. Machine according to claim 9, characterized in that each chain runs over an upper (25) and lower (28) chain wheel mounted rotationally about a horizontal axis (26, 27) located at a given distance from the sheeting tube (29).

11. Machine according to claim 10, characterized in that the dies (23) are mounted on the peripheral surfaces of two cylinders (18) which are rotationally mounted about two axes (17) equidistant from the sheeting tube (29) on two opposed sides of the same.

12. Machine according to claim 11, characterized in that a plurality of dies (23) are located at uniform spacings on the peripheral surface of each cylinder (18).

13. Machine according to claim 12, characterized in that a gudgeon (58) is mounted such that it can be longitudinally displaced in a guideway (57) at right angles to the peripheral surface of each cylinder (18), which gudgeon has a roller (20) on the end facing away from the sheeting tube (51) which runs over a frame-mounted cam track (19) and, on the end facing the sheeting tube (51), has the mandrel-like elevations (23) facing it.

14. Machine according to claim 13, characterized in that a compression spring (21) is provided in the guideways (57) which encloses the gudgeon (58) and presses against a stop on the guideway (57) on the one hand and a stop on the gudgeon (58) on the other.

15. Machine according to claim 14, characterized in that the cam track (19) has an elevation (59) in the area in which the mandrel-like elevations (23) engage the sheeting tube (51).

16. Machine according to claim 15, characterized in that the axes (17) of the cylinders (18) are connected with the drive of the guide elements (2) and pressure elements (1) or the drive of their chains (16) by means of a toothed or angular gear and/or timing belts.

17. Machine according to claim 16, characterized in that a welding device is provided in the front faces (54) of the pressure elements (1).

18. Machine according to claim 17, characterized in that the welding device encompasses electrical resistance wires.

19. Machine according to claim 11, characterized in that a gudgeon (58) is mounted such that it can be longitudinally displaced in a guideway (57) at right angles to the peripheral surface of each cylinder (18), which gudgeon has a roller (20) on the end facing away from the sheeting tube (51) which runs over a frame-mounted cam track (19) and, on the end facing the sheeting tube (51), has the mandrel-like elevations (23) facing it.

20. Machine according to claim 13, characterized in that the cam track (19) has an elevation (59) in the area in which the mandrel-like elevations (23) engage the sheeting tube (51).

21. Machine according to claim 11, characterized in that the axes (17) of the cylinders (18) are connected with the drive of the guide elements (2) and pressure elements (1) or the drive of their chains (16) by means of a toothed or angular gear and/or timing belts.

22. Machine according to claim 12, characterized in that the axes (17) of the cylinders (18) are connected with the drive of the guide elements (2) and pressure elements (1) or the drive of their chains (16) by means of a toothed or angular gear and/or timing belts.

23. Machine according to claim 13, characterized in that the axes (17) of the cylinders (18) are connected with the drive of the guide elements (2) and pressure elements (1) or the drive of their chains (16) by means of a toothed or angular gear and/or timing belts.

24. Machine according to claim 14, characterized in that the axes (17) of the cylinders (18) are connected with the drive of the guide elements (2) and pressure elements (1) or the drive of their chains (16) by means of a toothed or angular gear and/or timing belts.

25. Machine according to claim 16, characterized in that a welding device is provided in the front faces (54) of the pressure elements (1).

26. Machine according to claim 21, characterized in that a welding device is provided in the front faces (54) of the pressure elements (1).

27. Machine according to claim 22, characterized in that a welding device is provided in the front faces (54) of the pressure elements (1).

28. Machine according to claim 23, characterized in that a welding device is provided in the front faces (54) of the pressure elements (1).

29. Machine according to claim 24, characterized in that a welding device is provided in the front faces (54) of the pressure elements (1).

30. Machine according to claim 2, characterized in that the lateral faces (55) of the pressure elements (1) are plane and at an obtuse angle to the front face (54).

31. Machine according to claim 3, characterized in that the lateral faces (55) of the pressure elements (1) are plane and at an obtuse angle to the front face (54).

32. Machine according to claim 4, characterized in that the lateral faces (55) of the pressure elements (1) are plane and at an obtuse angle to the front face (54).

33. Machine according to claim 2, characterized in that each pressure element (1) has an inner guideway at right angles to the sheeting tube (51) in which a gudgeon (3) is mounted such that it is longitudinally displaceable, which gudgeon (3) has a roller (4) on the end facing away from the sheeting tube (51) which runs over a frame-mounted cam track (6) and, on the end facing the sheeting tube (51), has the front face (54) parallel to it.

34. Machine according to claim 3, characterized in that each pressure element (1) has an inner guideway at right angles to the sheeting tube (51) in which a gudgeon (3) is mounted such that it is longitudinally displaceable, which gudgeon (3) has a roller (4) on the end facing away from the sheeting tube (51) which runs over a frame-mounted cam track (6) and, on the end facing the sheeting tube (51), has the front face (54) parallel to it.

35. Machine according to claim 4, characterized in that each pressure element (1) has an inner guideway at right angles to the sheeting tube (51) in which a gudgeon (3) is mounted such that it is longitudinally displaceable, which gudgeon (3) has a roller (4) on the end facing away from the sheeting tube (51) which runs over a frame-mounted cam track (6) and, on the end facing the sheeting tube (51), has the front face (54) parallel to it.

* * * * *